United States Patent [19]

Burrows

[11] Patent Number: 4,853,117

[45] Date of Patent: Aug. 1, 1989

[54] PURIFIED WATER SUPPLY SYSTEM

[76] Inventor: Bruce D. Burrows, 24844 Anza Dr., Valencia, Calif. 91355

[21] Appl. No.: 108,770

[22] Filed: Oct. 15, 1987

[51] Int. Cl.⁴ .............................................. B01D 13/00
[52] U.S. Cl. ..................................... 210/110; 210/135; 210/136; 210/257.2
[58] Field of Search ............... 210/103, 110, 116, 134, 210/136, 257.2, 321.65, 135

[56] References Cited

U.S. PATENT DOCUMENTS

| | | | |
|---|---|---|---|
| 2,954,799 | 10/1960 | Kryzer et al. | 137/599.1 |
| 3,089,513 | 5/1963 | Kirk | 137/505.34 |
| 3,493,496 | 2/1970 | Bray et al. | 210/116 |
| 3,542,199 | 11/1970 | Bray | 210/116 |
| 3,568,843 | 3/1971 | Brown | 210/258 |
| 3,719,593 | 3/1973 | Astil | 210/135 |
| 3,726,793 | 4/1973 | Bray | 210/181 |
| 3,794,173 | 2/1974 | Bray | 210/257.2 |
| 3,831,757 | 8/1974 | Gossett | 210/143 |
| 3,887,463 | 6/1975 | Bray | 210/110 |
| 3,963,612 | 6/1976 | Gossett et al. | 210/143 |
| 3,967,638 | 7/1976 | Tondreau | 210/449 |
| 4,021,343 | 5/1977 | Tyler | 210/110 |
| 4,086,166 | 4/1978 | Martin | 210/134 |
| 4,176,063 | 11/1979 | Tyler | 210/101 |
| 4,210,533 | 7/1980 | Astl | 210/136 |
| 4,288,326 | 9/1981 | Keefer | 210/637 |
| 4,347,132 | 8/1982 | Davis | 210/104 |
| 4,391,712 | 7/1983 | Tyler et al. | 210/652 |
| 4,482,456 | 11/1984 | Grayson | 210/134 |
| 4,585,554 | 4/1986 | Burrows | 210/110 |
| 4,595,497 | 6/1986 | Burrows | 210/110 |
| 4,604,194 | 8/1986 | Entingh | 210/98 |
| 4,657,674 | 4/1987 | Burrows | 210/110 |
| 4,695,375 | 9/1987 | Tyler | 210/110 |
| 4,705,625 | 11/1987 | Hart, Jr. | 210/110 |
| 4,743,366 | 5/1988 | Burrows | 210/110 |

Primary Examiner—Richard V. Fisher
Assistant Examiner—Linda S. Evans
Attorney, Agent, or Firm—Kelly, Bauersfeld & Lowry

[57] ABSTRACT

An improved purified water supply system is provided of the type including a reverse osmosis unit for producing relatively pure water from ordinary tap water or the like. The reverse osmosis unit receives incoming tap water and produces separate outflows of purified water and relatively impure reject water. The purified water is supplied from the reverse osmosis unit to a purified water chamber within a compact storage vessel, wherein the purified water chamber is separated within the vessel by a movable barrier from a reject water chamber. When use of the purified water is desired, one or more faucet valves are opened to open a discharge path permitting purified water to flow from the storage vessel through a discharge spout or the like for use. An improved control valve assembly operates in conjunction with the faucet valve or valves to apply reject water under sufficient pressure to the reject water chamber to force purified water from the storage vessel through the open discharge path. The control valve assembly maintains the pressure within the storage vessel at a pressure substantially less than tap water line pressure to permit use of a relatively lightweight and economical storage vessel construction. In some embodiments, when the purified water discharge path is closed, the control valve assembly functions further to substantially relieve pressure within the storage vessel to correspondingly minimize system backpressure applied to the reverse osmosis unit.

27 Claims, 10 Drawing Sheets

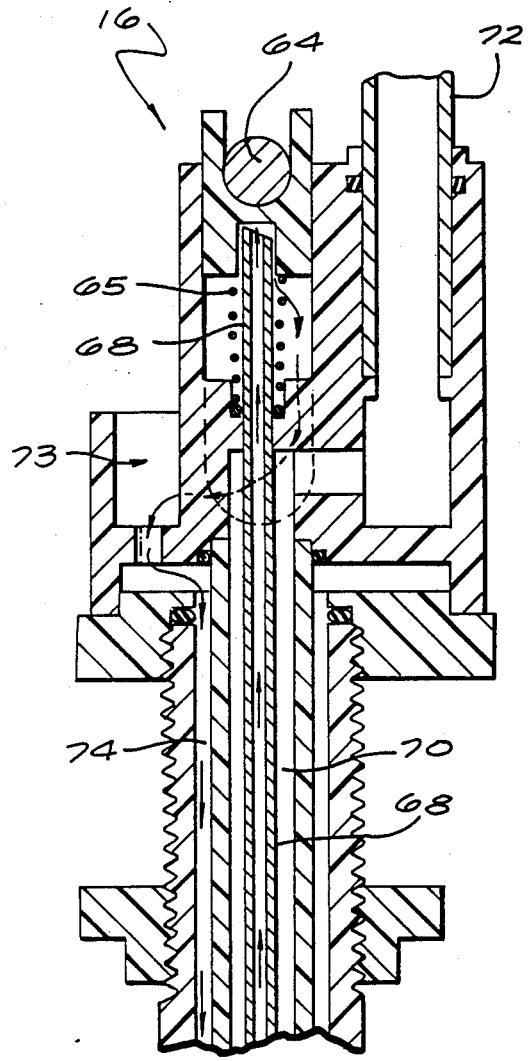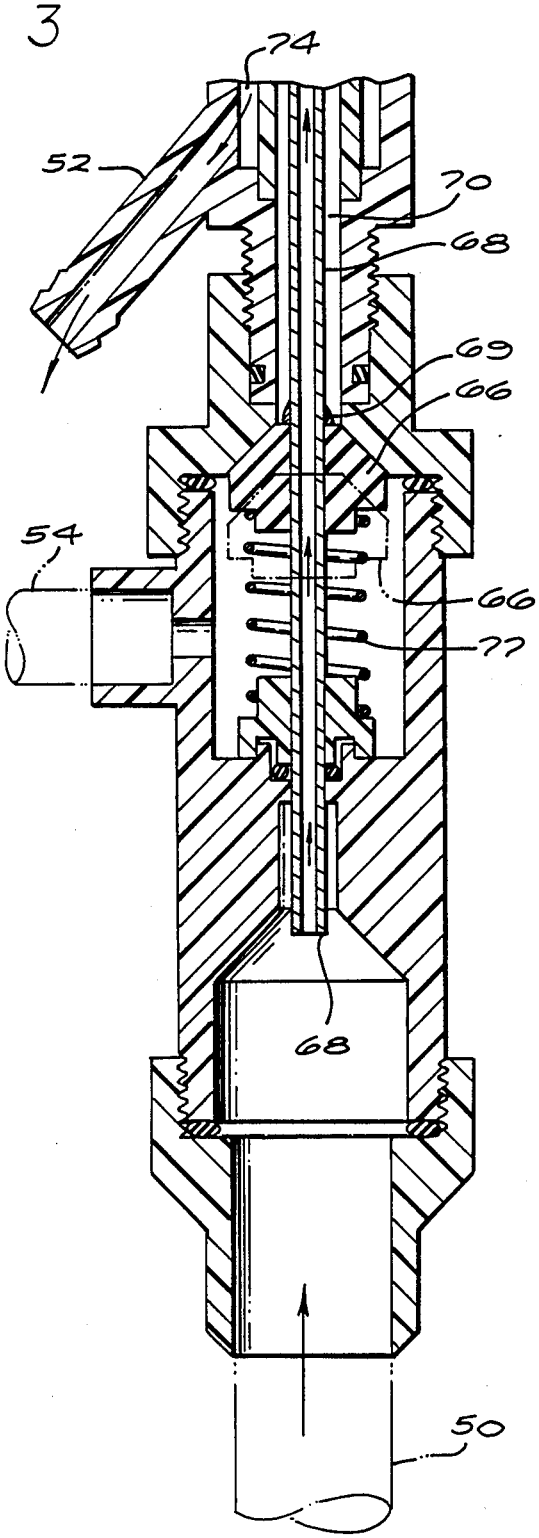
FIG. 2
FIG. 3

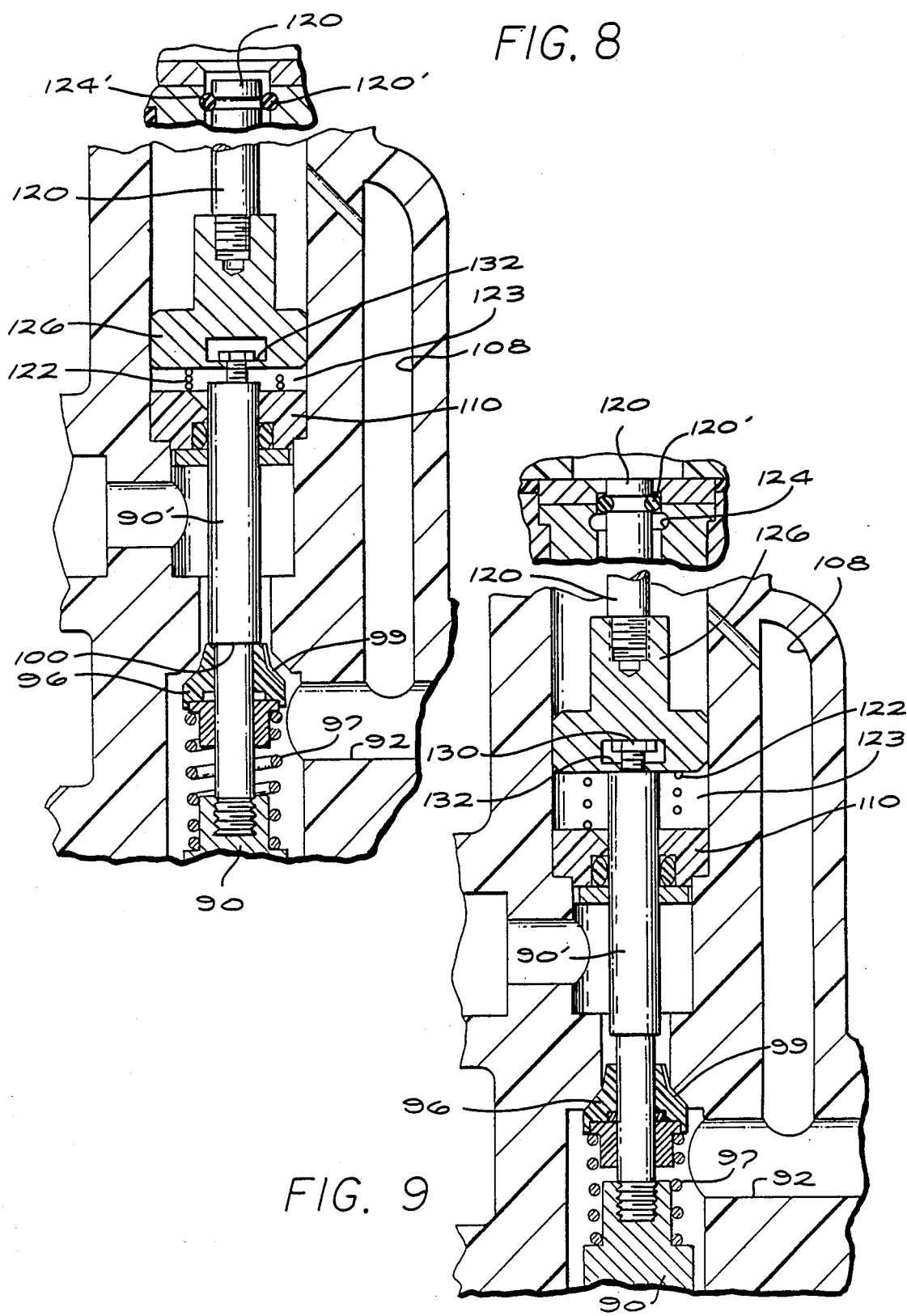

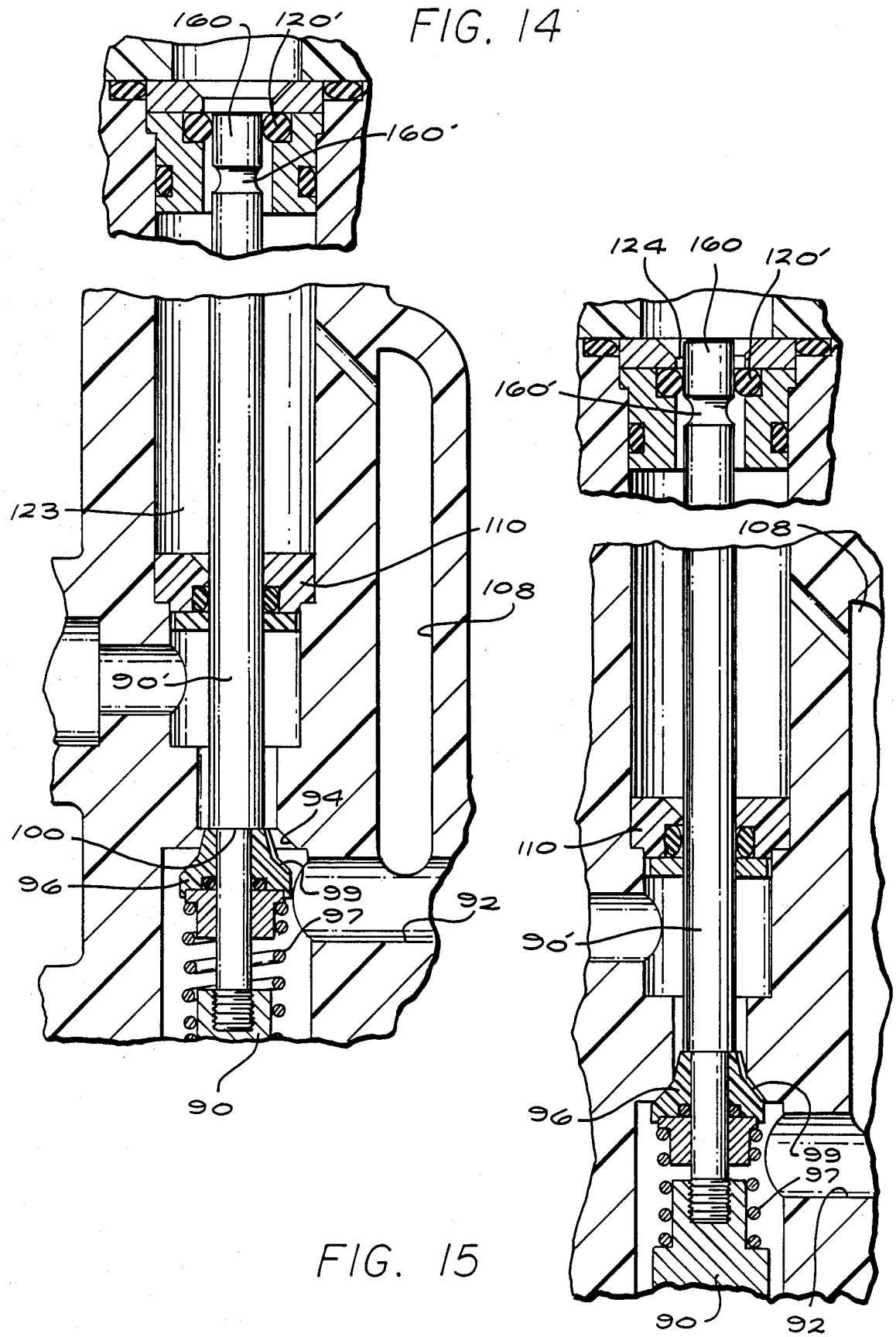

PURIFIED WATER SUPPLY SYSTEM

BACKGROUND OF THE INVENTION

This invention relates generally to improvements in purified water supply systems of the type having a reverse osmosis unit for producing purified water from an incoming supply of ordinary tap water or the like. More particularly, this invention relates to an improved purified water supply system having control means for providing effective delivery of purified water for use, while limiting fluid pressures within the system in a manner permitting relatively lightweight and economical system components.

Water purification systems in general are relatively well-known in the art for use in producing a supply of purified water from ordinary tap water or the like. Such water purification systems commonly include a reverse osmosis unit connected to an incoming tap water supply, wherein the reverse osmosis unit produces two separate water outflows including a purified water supply, and a waste or reject water supply, sometimes referred to as brine, with impurities concentrated therein. In purification systems of this type, the production of purified water is normally relatively slow whereby the purified water outflow is typically coupled to and stored within an appropriate storage vessel ready for dispensing when desired through a manually operated faucet valve or the like. Such purification systems are normally intended for installation into the compact cabinet space beneath a standard residential kitchen sink, with the faucet valve mounted on or at the sink in an accessible position for use. Examples of water purification systems of this general type are found, for example, by reference to U.S. Pat. Nos. 4,585,554 and 4,595,497.

In such water supply systems, the storage vessel for the purified water commonly includes a purified water chamber and a reject water chamber separated from each other by a movable barrier, such as a resilient diaphragm or bladder or the like. While the faucet valve is closed, the purified water expands and fills the purified water chamber to expel reject water from the reject water chamber for flow to a suitable drain. However, when dispensing of purified water is desired, for example, for cooking, drinking, etc. the faucet valve is opened to create an open discharge path communicating the purified water chamber to an open discharge spout or the like. At the same time, other valve components in the supply system function to supply a substantial flow of reject water into the reject water chamber thereby providing a fluid driving medium capable of forcing the purified water through the open discharge path to the discharge spout.

In the past, however, this substantial reject water flow into the reject water chamber for purified water delivery purposes has resulted in at least temporary pressurization of the reject water chamber to a level substantially equalling tap water line pressure. In domestic or residential water supply systems wherein the tap water line pressure is typically within the range of about 40 to 150 psi, the storage vessel is thus subjected to a substantial fluid pressure during normal operation of the water supply system. Such pressurization of the storage vessel has required relatively rugged vessel constructions of metal or reinforced plastic or fiberglass materials, whereby the storage vessel has constituted a major cost component in the water supply system.

Moreover, the presence of relatively high fluid pressures within the storage vessel enhances the risk of occasional failure of system components such as valves, seals, etc., resulting in water leaks and accompanying risk of water damage.

Still further, in the past, water supply systems of this general type have proposed the use of complicated valve arrangements with multiple, independently operated valve components required to control the various system water flows and pressures. Unfortunately, minor irregularities in the operation of a single valve component, such as leakage due to entrapped grit at a valve seat or other sealing surface, can result in system failure. In most available purified water supply systems, such system failures have required time consuming and costly disassembly of complicated valve components for repair purposes.

There exists, therefore, a significant need for an improved purified water supply system designed for reliable delivery of purified water from a storage vessel of relatively lightweight, cost-efficient construction, wherein the system includes means for limiting fluid pressures in the storage vessel to pressure levels substantially below tap water line pressure. Moreover, there exists a need for such a system wherein the structure and movements of controlling valve components are simplified and adapted for reduced likelihood of failure. The present invention fulfills these needs and provides further related advantages.

SUMMARY OF THE INVENTION

In accordance with the invention, an improved purified water supply system is provided for use in producing and storing a supply of relatively purified water from an incoming supply of ordinary tap water or the like. The improved water supply system includes a compact storage vessel for containing the produced purified water available for immediate use, wherein the system includes means for limiting pressures within the storage vessel to a pressure level substantially below tap water line pressure.

In a preferred arrangement, the water supply system includes a reverse osmosis unit having an inlet coupled to a supply of ordinary tap water or the like. The reverse osmosis unit operates in a known manner to produce dual water outflows, namely, the purified water supply with impurities substantially removed, and a supply of reject water or brine with impurities concentrated therein. The purified water supply is stored within the storage vessel ready for dispensing, for example, through a discharge path which can be opened upon operation of one or more faucet valves, whereas the reject water supply is ultimately discharged to an appropriate drain.

The storage vessel comprises a relatively lightweight and preferably compact tank container defining an internal purified water chamber and a reject water chamber separated from each other by a movable barrier. The produced purified water supply is coupled for flow into the purified water chamber, whereas the produced reject water supply is coupled to an improved control valve assembly disposed along the purified water discharge path. The control valve assembly responds to the operational state of the faucet valve or valves to direct the reject water supply to the reject water chamber or, in the alternative, to the drain. Importantly, the control valve assembly incorporates fluid pressure regulator means for limiting the fluid pressure within the reject water chamber to a pressure level substantially below tap water line pressure, thereby correspondingly regulating the fluid pressure within the entire storage vessel.

More specifically, the control valve assembly responds to opening of the faucet valve or valves to supply reject water at a substantial flow rate to the reject water chamber in the storage vessel. This substantial reject water flow rate is effective to pressurize the reject water chamber to a sufficient fluid pressure level to provide the driving medium expelling purified water from the storage vessel for flow along the discharge path. However, the control valve assembly maintains the pressure within the reject water chamber at a pressure level substantially below tap water line pressure to avoid subjecting the pressure vessel to relatively high fluid pressures. In one embodiment of the invention, the selected maximum reject water chamber pressure level is maintained when the faucet valve or valves are closed. In other embodiments of the invention, the control valve assembly operates to substantially relieve the fluid pressure within the storage vessel when purified water dispensing is halted.

In preferred constructions, the control valve assembly includes a piston member associated with the purified water discharge path and adapted for movably responding upon fluid pressure changes along that path attributable to opening of the faucet valve or valves. This movement of the piston member displaces a slotted valve head of a reject water flow control valve from a flow limiting position to a fully open position permitting relatively high flow of reject water into the reject water chamber of the storage vessel. At the same time, the piston member movement directly or indirectly results in displacement of a reject water drain valve to a closed position thereby insuring sufficient pressure rise in the reject water chamber to expel purified water through the open discharge path. Subsequent closure of the faucet valve or valves is accompanied by return movement of the piston member to reseat the slotted valve head in the flow limiting position to restrict reject water flow into the reject water chamber. The reject water drain valve initially remains in the closed position upon valve head closure to issue full reseating thereof after which time the drain valve is unseated to prevent further pressure rise in the storage vessel. In some embodiments of the invention, the drain valve opens sufficiently to maintain chamber pressure within the storage vessel at a selected threshold pressure below tap water line pressure. In other embodiments, the drain valve is opened fully to relieve storage vessel pressure substantially to an atmospheric pressure level.

The control valve assembly has a simplified construction adapted for reliable, substantially failsafe operation of the various valve components therein. More particularly, the pressure responsive piston member, the slotted valve head controlling reject water flow into the storage vessel, and the reject water drain valve are arranged in an inline configuration for substantially coaxial linear motion. Movement of the piston member is transmitted directly to the slotted valve head and further is transmitted directly to the drain valve to provide positive mechanical actuation.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompany drawings illustrate the invention. In such drawings:

FIG. 2 is an enlarged fragmented vertical sectional view illustrating construction details of one preferred faucet valve assembly;

FIG. 3 is an enlarged fragmented vertical sectional view depicting construction details of a lower portion of the faucet valve assembly of FIG. 2;

FIG. 8 is a further enlarged fragmented vertical sectional view of the control valve assembly of FIG. 7, and depicting the control valve assembly in an open position during purified water dispensing;

FIG. 9 is an enlarged fragmented vertical sectional view similar to FIG. 8 and depicting control valve assembly movement upon termination of purified water dispensing;

FIG. 14 is an enlarged fragmented vertical sectional view similar to a portion of FIG. 13 and depicting the control valve assembly in an open position during purified water dispensing; and FIG. 15 is an enlarged fragmented vertical sectional view similar to FIG. 14 and showing reclosure of the control valve assembly at the conclusion of purified water dispensing.

DETAILED DESCRIPTION OF THE PREFERRED EMBODIMENTS

Figure 1:
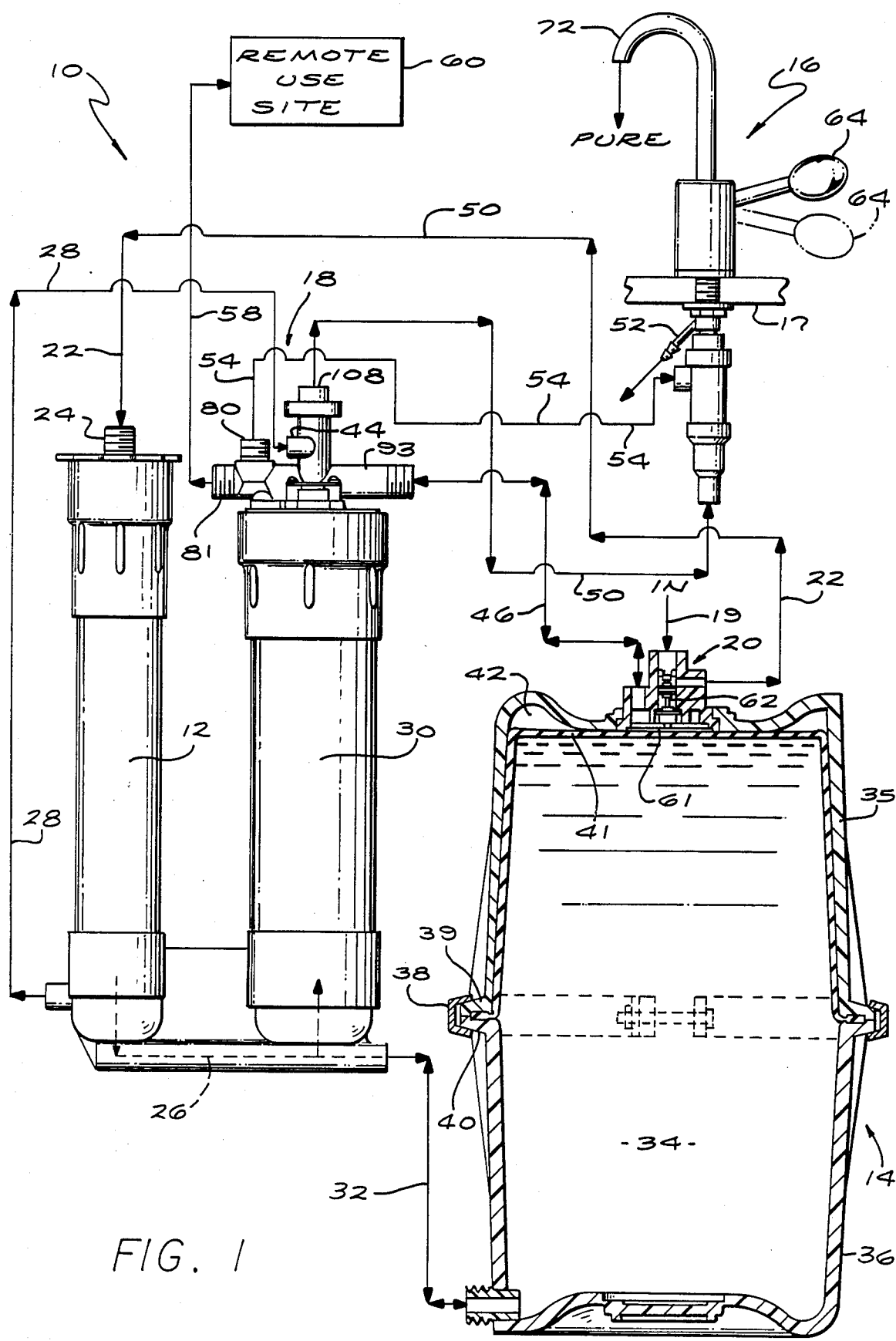
FIG. 1 is a diagrammatic view illustrating an improved purified water supply system embodying the novel features of the invention.

As shown in the exemplary drawings, an improved purified water supply system is referred to generally by the reference numeral 10 in FIG. 1. The water supply system 10 includes a reverse osmosis unit 12 for converting an ordinary tap water supply or the like into a relatively pure supply of water which is stored temporarily within a relatively lightweight and compact storage vessel 14. The purified water within the storage vessel 14 is delivered on demand for use by operation of a faucet valve assembly 16. Importantly, in accordance with the invention, a control valve assembly 18 functions in cooperation with the faucet valve assembly 16 to insure reliable delivery of the purified water from the storage vessel 14, while limiting the fluid pressure within the storage vessel to a pressure level substantially less than tap water line pressure.

The improved purified water supply system 10 of the present invention is designed particularly for use in residential and other domestic applications to produce a ready supply of relatively pure water from ordinary tap water or the like. The system 10 utilizes the reverse osmosis unit 12 to convert an incoming supply of ordinary tap water into dual water outflows including a supply of relatively pure water and a waste or reject water supply, sometimes referred to as brine, having impurities concentrated therein. The purified water supply is normally coupled to and stored within the storage vessel 14 ready for use on demand for drinking, cooking, etc. Moreover, in reference to one aspect of the present invention, the purified water supply can be coupled to multiple use sites such as an icemaker or a chilled water station of the type included in many modern refrigerator units. The control valve assembly 18 operates in conjunction with opening and closing of an appropriate faucet valve at each one of the multiple use sites to insure reliable purified water delivery.

The water supply system 10 advantageously utilizes the generated supply of reject water as a driving medium for expelling purified water from the storage vessel 14, when dispensing of purified water is desired. However, the control valve assembly 18 regulates the supply of reject water to the storage vessel in a manner limiting maximum storage vessel internal pressure to a threshold level substantially less than tap water line pressure. Accordingly, the reject water supply is used to provide a sufficient driving force to the stored purified water for dispensing purposes, while maintaining internal vessel pressures relatively low, thereby avoiding internal pressures at tap water line pressures which can range between 40–150 psi. The use of relatively low vessel pressures beneficially permits economic storage vessel construction of lightweight molded plastic or the like, to correspondingly reduce the overall cost and complexity of the water supply system.

As shown generally in FIG. 1, in one preferred system arrangement, a tap water supply line 19 of a standard residential water supply system or the like is coupled to an inlet throttle valve 20. This throttle valve 20 is normally open to permit tap water flow through a feed conduit 22 to an inlet 24 on the reverse osmosis unit 12. The reverse osmosis unit 12 includes an internal membrane (not shown) which functions in a manner known to those skilled in the art to separate the incoming water tap water into the purified water supply and the reject water supply. The purified water supply is discharged from the reverse osmosis unit 12 through an outlet conduit 26, whereas the reject water is discharged through a separate outlet conduit 28.

The purified water supply produced by the reverse osmosis unit 12 is coupled by the conduit 26 for flow alternately to a filter unit 30 containing carbon filter material or the like, or through a conduit 32 into a purified water chamber 34 within the storage vessel 14. As shown best in FIG. 1, this storage vessel 14 comprises a relatively lightweight tank container formed from a pair of cup-shaped sections 35 and 36 mounted one on top of the other in facing relation and securely connected by a circumferential band 38 or the like fastened about outwardly radiating, mating flanges 39 and 40. A movable barrier 41 such as a cup-shaped resilient diaphragm or the like has its periphery trapped between the flanges 39 and 40 and functions to divide the internal volume of the vessel 14 into the purified water chamber 34 and an upper reject water chamber 42.

The reject water supply produced by the reverse osmosis unit 12 flows through the reject water conduit 28 to an associated inlet port 44 of the control valve assembly 18. As will be described in more detail, the control valve assembly 18 redirects the reject water supply through an appropriate conduit 46 for flow into the reject water chamber 42 of the storage vessel 14, or, in the alternative, through a drain conduit 50 to the faucet valve assembly 16 ultimately for discharge to an appropriate drain through a drain tube 52. Similarly, the control valve assembly 18 is connected inline with a discharge path through which purified water may be discharged for the storage vessel 14, wherein this discharge path may lead to multiple sites of use of the purified water such as the faucet valve assembly 16 via a primary discharge conduit 54, or for alternate flow through a secondary discharge conduit 58 to an alternative use site 60, for example, such as an icemaker or a chilled water drinking station in a modern refrigerator.

In general operation of the water supply system 10, when the faucet valve assembly 16 and other purified water faucet valves or the like are closed, the reverse osmosis unit 12 produces purified water which expands and fills the purified water chamber 34 in the storage vessel 14. During this filling process, reject water produced by the reverse osmosis unit is coupled to the faucet valve assembly 16 for flow through the drain tube 52 to drain. At the same time, reject water within the vessel reject water chamber 42 is expelled by the expanding purified water chamber for flow through the control valve assembly 18 and further to drain. When the purified water chamber 34 becomes substantially filled, the movable barrier 41 advantageously contacts a pressure plate 61 forming a portion of the inlet throttle valve 20 to move a throttle valve member 62 to a closed position throttling or halting incoming tap water flow to the system. A further description of the structure and operation of the inlet throttle valve 20 is found in the inventor's U.S. Pat. No. 4,595,497 and copending application Ser. No. 848,351, filed Apr. 4, 1986, now U.S. Pat. No. 4,743,366, which are incorporated by reference herein.

As shown in FIGS. 1–3, in one preferred form, the faucet valve assembly 16 is normally mounted on the drain board 17 or the like of a sink and includes a movable valve handle 64 biased by a spring 65 (FIG. 2) toward a position permitting a valve member 66 (FIG. 3) to be carried by a spring 77 to a normally closed position. However, when the faucet handle 64 is depressed to the dotted line position shown in FIG. 1, the handle 64 bears against and depresses a tubular valve stem 68 having a stop 69 thereon for displacing the valve member 66 to an open position, as viewed in dotted lines in FIG. 3. In this open position, the valve member 66 permits flow of purified water from the vessel 14 through the associated conduit 54, and upwardly though a now-open discharge passage 70 for discharge through a discharge spout 72 (FIG. 1). In this dispensing position, as will be described in more detail, a substantial reject water flow is directed into the vessel reject water chamber 42 at a sufficient pressure to provide a fluid driving medium for forcing the purified water to flow in a reliable, accurate matter through the now-open discharge path. Alternately, as depicted with respect to the remote use site 60, the purified water discharge path may direct the purified water to one or more additional points of use upon appropriate opening of a faucet valve (not shown) or the like at that remote use site.

Upon termination of purified water dispensing at the faucet valve assembly 16 and/or at other use sites, the system reverts to a normal mode as described previously wherein the purified water chamber 34 is refilled with produced purified water. In this mode, using the illustrative faucet valve assembly 16, reject water produced by the reverse osmosis unit 12 as well as water within the reject water chamber 42 are coupled via the drain conduit 50 to drain via the faucet valve assembly 16. As shown in FIGS. 2 and 3, this reject water flow passes upwardly through the tubular valve stem 68 for discharge into a vented receiver 73 thereby providing an air gap for the drain portion of the system. From the receiver 73, the reject water spills into a drain path 74 for passage to and flow through the drain tube 52.

Conveniently, for purposes of brevity, the structure and operation of the exemplary faucet valve assembly 16 has been described briefly herein, it being understood that various faucet valve assembly arrangements may be used in the system of the present invention. However, the illustrative faucet valve assembly (FIGS. 1–3) provides a preferred construction corresponding generally with that shown and described in the inventor's U.S. Pat. No. 4,585,554, and related continuation application Ser. No. 125,777, filed Nov. 25, 1987, which are incorporated by reference herein. Moreover, it will be understood that multiple faucet type valves may be used for purified water dispensing at multiple sites of use, although only one reject water drain arrangement is required.

Figure 4:
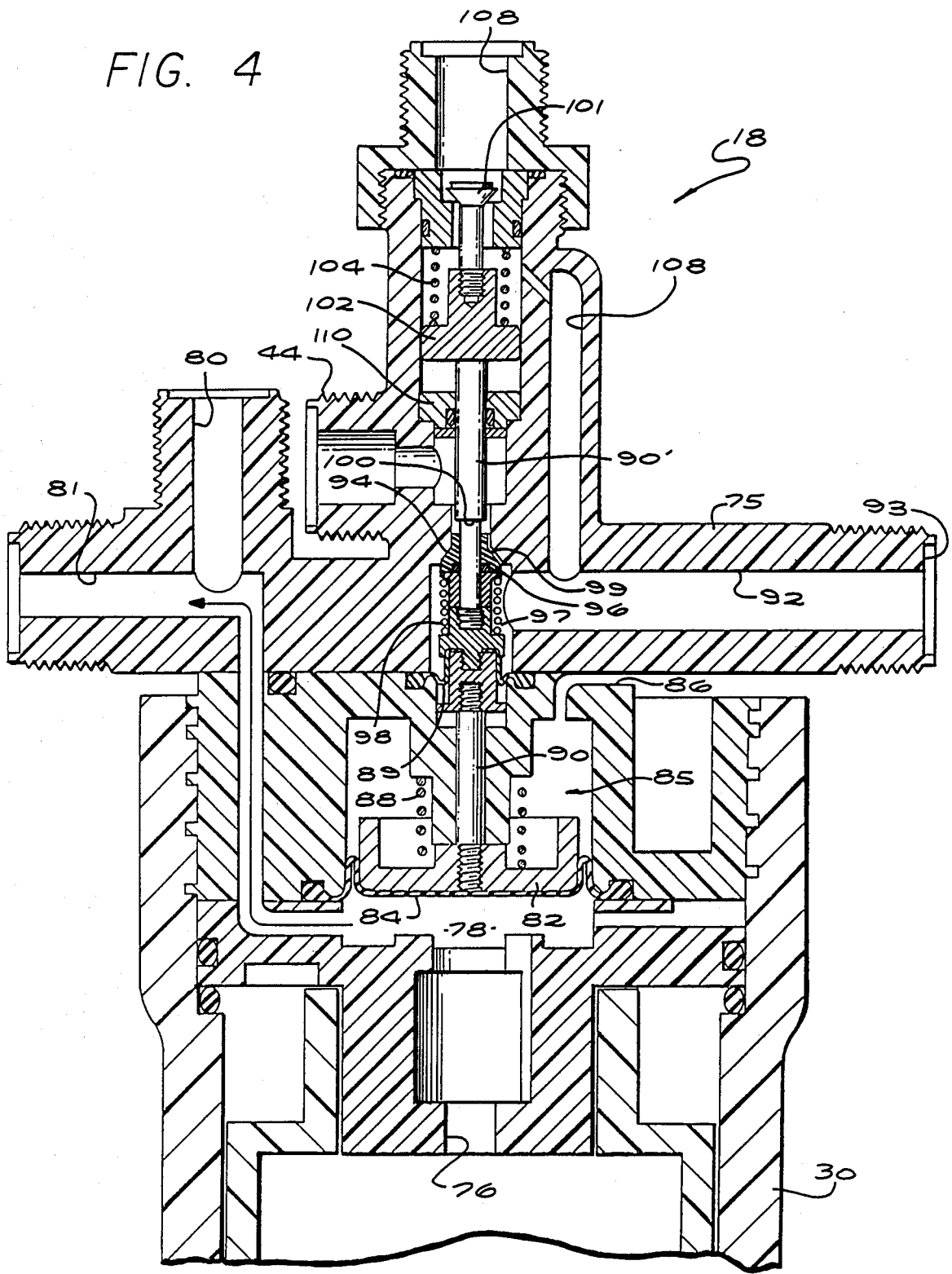
FIG. 4 is an enlarged fragmented vertical sectional view depicting a preferred control valve assembly for use with the invention.
Figure 5:
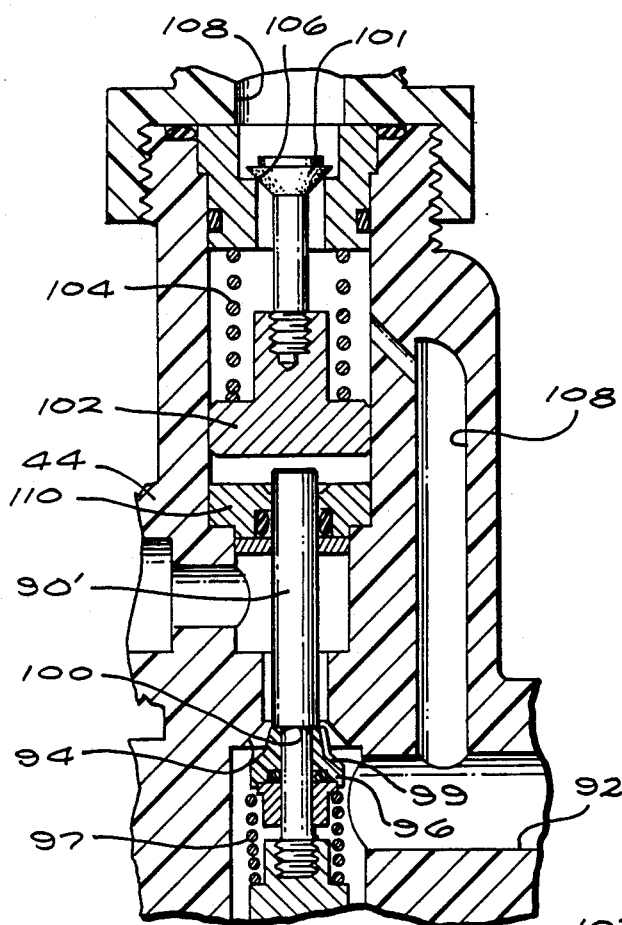
FIG. 5 is a further enlarged fragmented sectional view depicting the control valve assembly in an open position during purified water dispensing.
Figure 6:
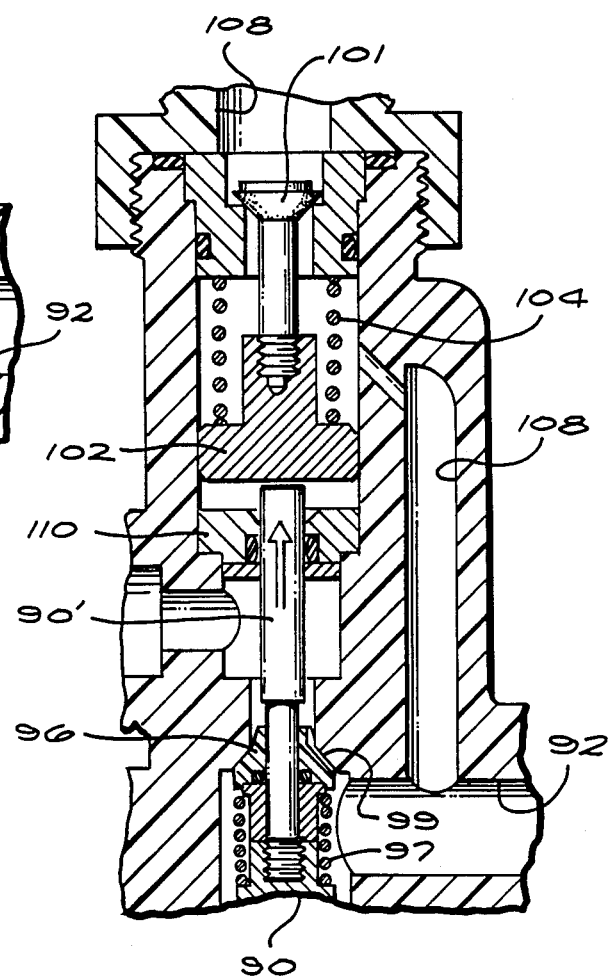
FIG. 6 is an enlarged fragmented vertical sectional view similar to FIG. 5 but depicting control valve assembly movement upon termination of purified water dispensing.

As shown in one preferred form in FIGS. 4–6, the control valve assembly 18 comprises an assembled multi-part valve housing 75 adapted for mounting in any suitable manner onto the top or discharge side of the filter unit 30. This valve housing 75 defines a lower inlet port 76 in flow communication with the purified water chamber 34 in the storage vessel 14 via the filter unit 30 and the purified water conduit 32. From the inlet port 76, the purified water is free to flow initially into a pressure chamber 78 and then to a pair of pure water outlets 80 and 81 leading respectively to the faucet valve unit 16 and to the remote use site 60. Purified water flow through these outlets to the use sites is turned on and off, of course, by the operational state of faucet valve members at those use sites. Additional pure water outlets may be provided, as desired.

A pressure responsive piston member 82 defines a movable wall lining one side of the pressure chamber 78 within the control valve housing 75. As shown in FIG. 4, the outboard face of this pressure responsive piston member 82 is lined by a fabric reinforced resilient diaphragm 84 mounted on the housing to accommodate piston member displacement with respect to the pressure chamber 78. The inboard face of the piston member 82 is exposed to an internal chamber 85 vented to atmosphere through a vent 86. A biasing spring 88 reacts between the housing 75 and the inboard side of the piston member 82 for urging the piston normally in a direction reducing the volume of the pressure chamber 78.

The movable piston member 82 carries an elongated stem 90 which projects through the housing 75 in a direction away from the pressure chamber 78. The stem 90 extends upwardly through a seal diaphragm 89 into a reject water flow path 92 communicating between the reject water inlet 44 and an outlet 93 leading to the storage vessel 14, and further through a valve seat 94 disposed along the flow path 92 before terminating in an upper stem portion 90′ of somewhat enlarged diameter. A valve head 96 of a reject water flow control valve is slidably carried on the valve stem 90 below the upper stem portion 90′ and is normally biased by a spring 97 reacting between the underside of the valve head 96 and lower shoulder 98 of the stem 90 to urge the valve head 96 toward the seat 94.

The valve head 96 has a slot 99 in the face thereof to permit a restricted or limited reject water flow through the flow path 92 when the valve head 96 is on the seat 94. The valve head 96 is maintained in this flow limiting position by the combined action of the biasing spring 97 and the piston member 82 when the fluid pressure in the pressure chamber 78 is relatively high, namely, when all faucet valves for dispensing purified water are closed. However, when one of the faucet valves is opened, the pressure in the chamber 78 is reduced whereby the piston member 82 descends to decrease the chamber volume. This displacement of the piston member 82 draws downwardly on the stem 90 to slide a shoulder 100 on the lowermost end of the enlarged stem portion 90′ into contact with the valve head 96. Further downward motion of the stem 90 unseats the valve head 96 to a fully open position, as viewed in FIG. 5, thereby permitting a substantial flow rate of reject water through the flow path 92 and into the reject water chamber 42 in the storage vessel 14. This substantial flow, as previously described, provides the fluid driving medium to force purified water through the selected open faucet valve.

When the above-described dispensing flow of purified water is initiated, an upper drain valve 101 within the control valve assembly 18 is positively seated in a closed position to halt passage of reject water to the drain. More specifically, as viewed in FIGS. 4 and 5, opening movement of the lower valve head 96 is accompanied by downward motion of the upper stem portion 90′ to spaced relation with a support piston 102 connected to the drain valve 101. When this occurs, a valve spring 104 displaces the support piston in a downward direction to carry the drain valve 101 into seated relation with an associated valve seat 106 closing a drain path 108 leading from the reject water flow path 92 to the drain conduit 50 and ultimately to the drain. Accordingly, the substantial flow of reject water is guided in its entirety into the reject water chamber 42 of the storage vessel, resulting in expansion of the reject water chamber at a sufficient pressure to contract the size of the purified water chamber 34 and force the purified water from the vessel through the now-open discharge path. Importantly, the closed drain valve 101 insures the presence of sufficient fluid pressure with the reject water chamber to provide the necessary fluid driving medium. However, the open condition of one or more faucet valves for purified water dispensing prevents any significant pressure rise in the vessel 14 during this mode of operation.

When dispensing of purified water is halted, the appropriate faucet valve or valves are closed to correspondingly close the discharge path for the purified water. This closure of the discharge path is accompanied by a pressure rise along the discharge path including the pressure chamber 78 within the control valve assembly 18. The increased pressure in the pressure chamber 78 is attributable to continued flow of reject water into the reject water chamber 42 and eventually rises to a level sufficient to cause the piston member 82 to undergo a return displacement increasing the volume of the chamber 78, as viewed in FIG. 6. During this movement, the stem 90 is displaced back toward its original position permitting the associated valve head spring 97 to reseat the valve head 96 of the valve seat 94. As a result, the valve head 96 is returned to the flow limiting position permitting a slow flow of reject water through the valve head slot 99.

After reseating of the valve head 96, the continued albeit slow reject water flow into the reject water chamber 42 causes the vessel pressure to continue to rise. This results in a corresponding slow continued pressure rise within the pressure chamber 78, thereby displacing the piston member 82 and its stem 90 further with respect to the now-seated valve head 96. The upper portion 90' of the stem protrudes upwardly through a seal unit 110 and eventually moves into contact with the underside of the drain valve support piston 102. When this occurs, further pressure increase in the pressure chamber 78 causes further displacement of the stem portion 90' sufficiently to open the drain valve 101 relative to its seat 106. In this embodiment, the drain valve 101 is opened by an increment sufficient to achieve partial pressure relief within the reject water chamber 42 by bleeding a small amount of the reject water therein. The drainage bleed of reject water occurs when the vessel pressure reaches a predetermined threshold selected to be substantially below tap water line pressure and continues in sufficient quantity to maintain vessel pressure at the set threshold pressure to drain reject water from the vessel 14 as the purified water chamber 34 refills. The specific threshold pressure can be selected by appropriate design of the surface area of the piston member 82 and the forces applied by the various springs in the system.

Accordingly, the embodiment of FIGS. 4-6 maintains the vessel pressure level substantially at the preset threshold refilling of the purified water chamber 34 when all of the faucet valves in the system are closed. This selected preset threshold will normally be chosen at about 17-25 psi—a pressure level significantly below tap water line pressure to avoid applying relatively high fluid pressures to the storage vessel 14—and further selected to avoid undue backpressure applied to the reverse osmosis unit during normal production of purified water. This relatively low threshold pressure can be offset economically by moderate increases in membrane surface area provided in the reverse osmosis unit. However, if minimum backpressures are desired upon the reverse osmosis unit, the threshold pressure in the reject water chamber can be set lower, with corresponding decreases in purified water delivery rate during dispensing procedures.

Figure 7:
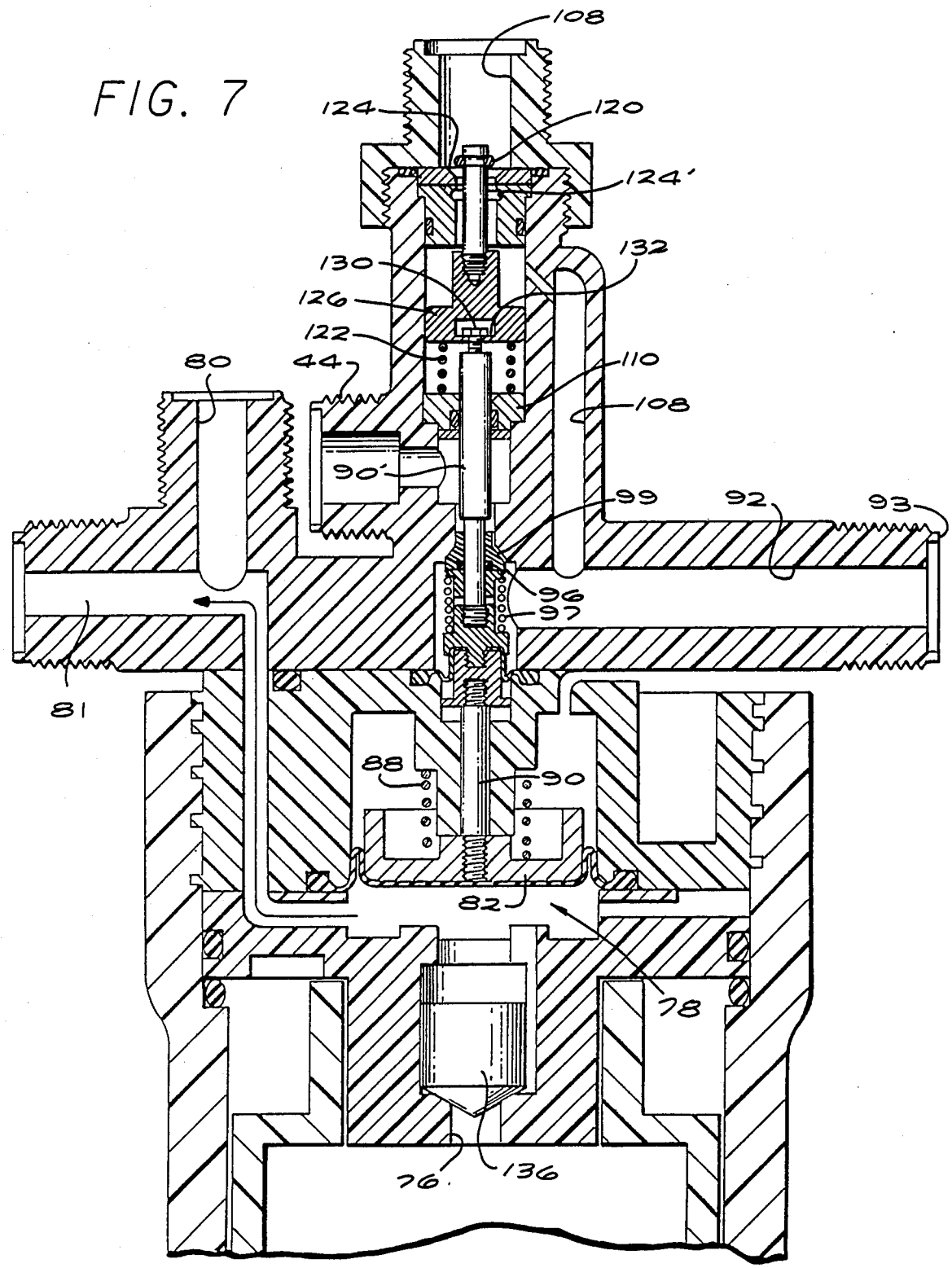
FIG. 7 is an enlarged fragmented vertical sectional view similar to FIG. 4 and depicting one alternative embodiment of the control valve assembly for use with the invention.

FIGS. 7-9 depict one alternative construction for the reject water drain valve used in the purified water system, with the remaining system components being otherwise identical to those shown and described in FIGS. 1-6. In this embodiment, a drain valve 120 is biased by a spring 122 toward a normal fully opened position relative to an associated valve seat 124. This drain valve 120 is maintained in the open position during normal refilling of the vessel 14 with purified water to correspondingly minimize backpressure applied to the reverse osmosis unit 12. However, during dispensing of purified water upon opening of one or more faucet valves in the system, the drain valve 120 is moved to a fully closed position to insure generation of sufficient pressure in the vessel 14 for proper purified water delivery purposes.

More particularly, as shown in FIG. 7, the drain valve 120 is carried by a lower support piston 126, in the same manner previously described with respect to FIGS. 4-6. However, the support piston 126 and the drain valve 120 are biased toward an open position by the spring 122 within a chamber 123 and reacting between the seal unit 110 and the underside of the support piston 126. Accordingly, when the system faucet valves are closed such that purified water is not being dispensed, the drain valve 120 is fully opened to permit substantial drainage flow of reject water through the drain path 108, thereby maintaining the vessel pressure at a substantially minimum pressure approaching atmospheric pressure.

When purified water is dispensed, the pressure within the pressure chamber 78 falls to cause the piston member 82 to be drawn into the pressure chamber 78. As previously described with respect to FIGS. 4-6, such piston member movement pulls the stem 90 including its enlarged upper stem portion 90' in a downward direction for positive and substantial displacement of the slotted valve head 96 to the fully open position. However, in the embodiment of FIGS. 7-9, during this downward stem motion, an upper abutment 130 such as a screw head or the like on the upper end of the stem portion 90' engages a land 132 of the support piston 126 to draw the support piston and the drain valve 120 carried thereby to the positively closed position. This positively closed position is achieved, in this embodiment, by sliding motion of an O-ring 120' on the drain valve which slides into and effectively locks within a shallow groove 124' in the valve seat structure. Alternately, the O-ring may be mounted in the valve seat structure and the groove formed in the drain valve 120. In either case, in this configuration, the control valve assembly permits a substantial reject water flow through the path 92 into the reject water chamber 42, while the drain valve 120 is closed, to insure fluid-activated delivery of the purified water from the storage vessel.

Reclosure of the system faucet valve or valves halts purified water dispensing such that the pressure rises within the pressure chamber 78 to return the piston member 82 to its original position. This piston member movement initially reseats the slotted valve head 96, followed by continued upward movement of the stem 90. The abutment 130 on the upper stem portion 90' eventually contacts the support piston 126 and displaces the piston 126 with the drain valve 120 back to the fully open position. Importantly, this drain valve opening is postponed in time until after full seating of the valve head 96 to reinstitute regulated flow along the path 92 by means of the valve head slot 99. The locking engagement between the O-ring 120' and the groove 124' retains the drain valve in the closed position, despite pressure rise in the reject water chamber and the force applied by the spring 122. However, the support piston 126 is driven by the upward motion of the abutment 130 to dislodge the O-ring 120′, at which time the combined effects of pressure and the spring 122 pop the drain valve 120 back to the fully open position. The fully opened drain valve 120 thus relieves pressure within the vessel 14 for minimum backpressuring of the reverse osmosis unit. A check valve 136 (FIG. 7) is provided at the inlet port 76 to the control valve assembly to prevent loss of pressure in the pressure chamber 78 until subsequent flow of purified water for dispensing purposes is desired.

Figure 10:
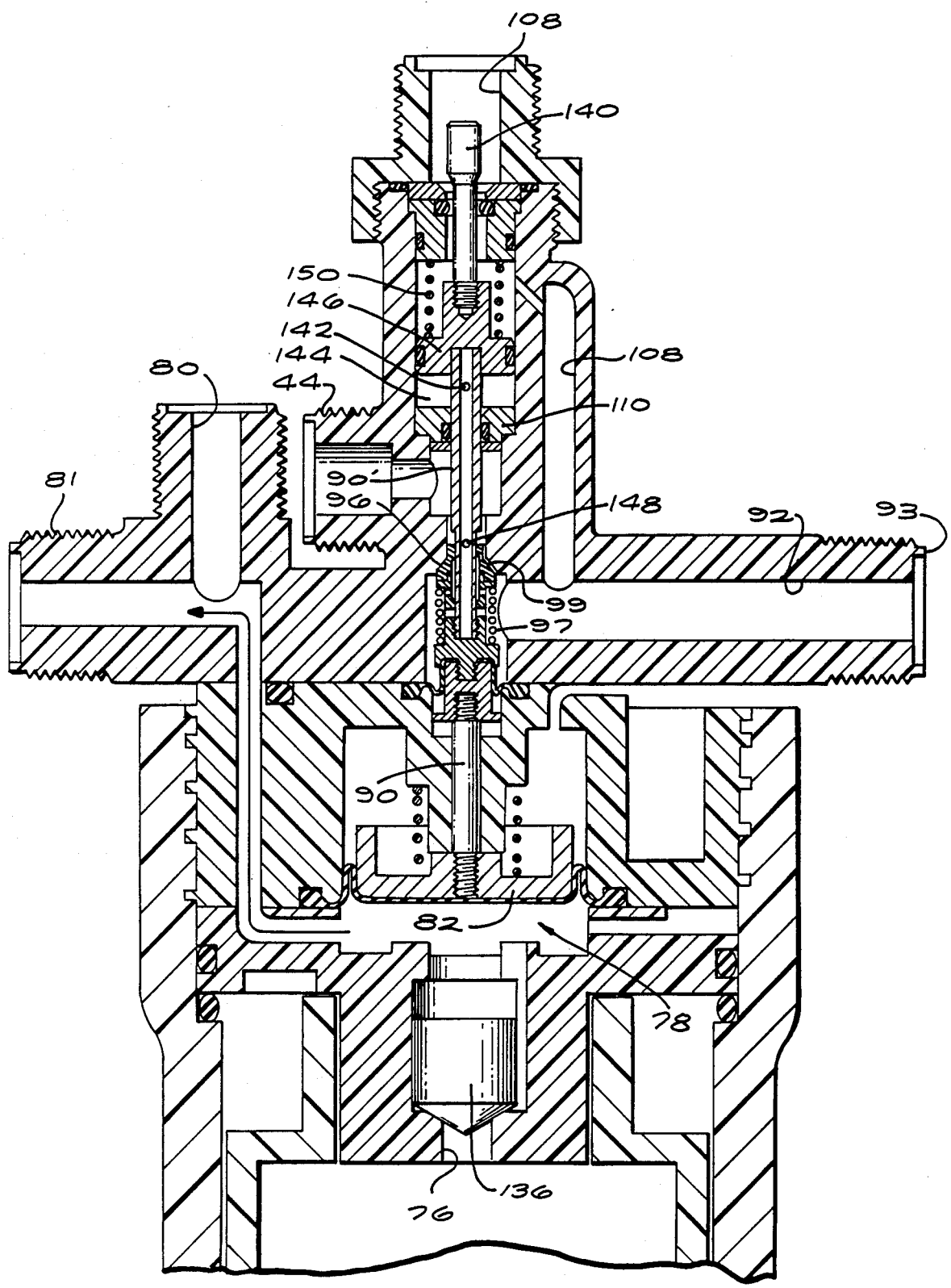
FIG. 10 is another fragmented vertical sectional view similar to FIG. 4 but depicting another alternative form of the invention.
Figure 11:
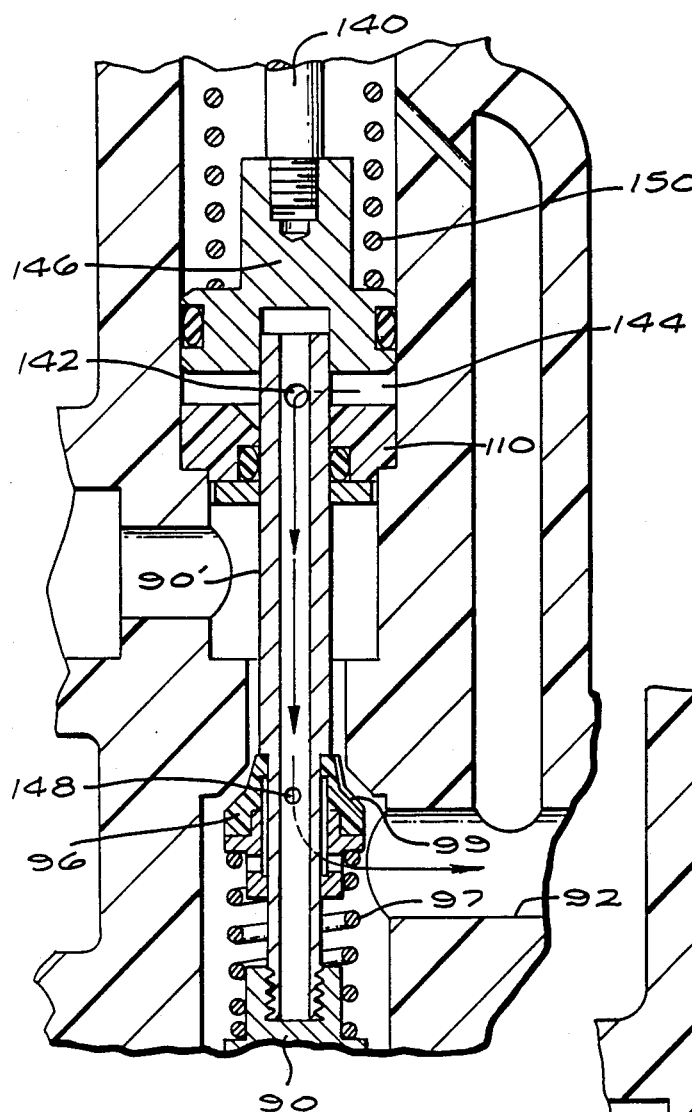
FIG. 11 is a further enlarged fragmented vertical sectional view similar to FIG. 10 and depicting the control valve assembly in an open condition.
Figure 12:
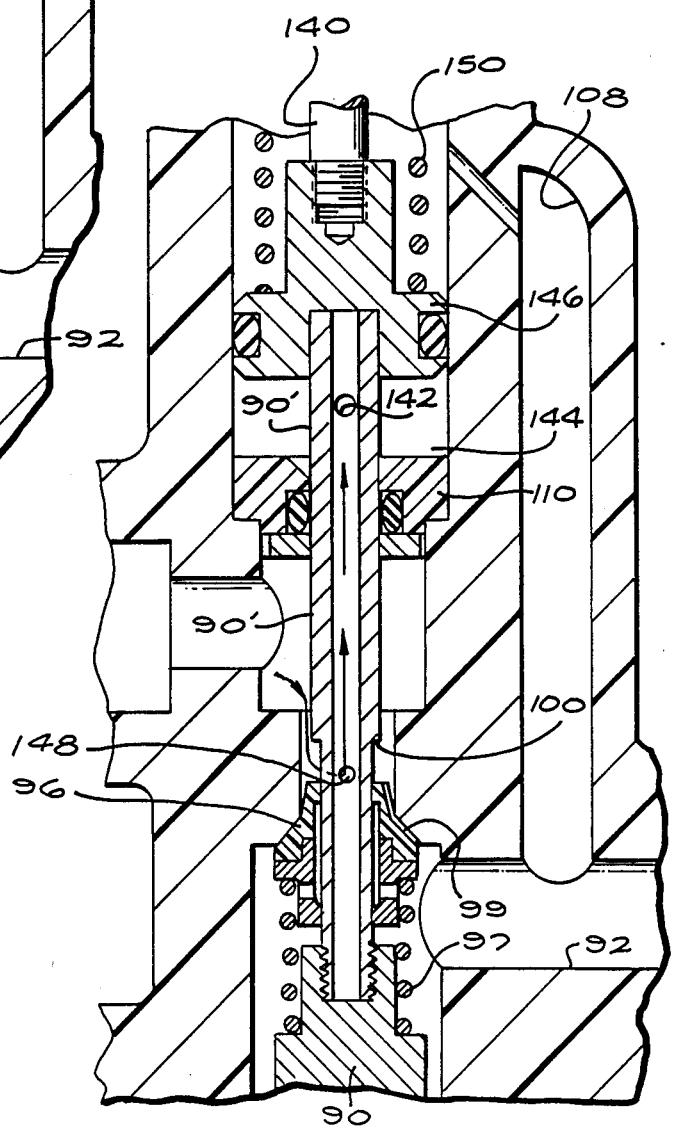
FIG. 12 is an enlarged fragmented vertical sectional view similar to FIG. 11 but depicting control valve assembly movement when purified water dispensing is terminated.

Another alternative embodiment of the control valve assembly is shown in FIGS. 10–12, wherein the control valve assembly includes a modified drain valve arrangement for fully opening a reject water drain valve 140 during normal refilling of the storage vessel with purified water. In this version, the control valve assembly again includes a pressure chamber 78 within which a significant fluid pressure is maintained separate from the water storage vessel by means of a check valve 136 or the like. The normal fluid pressure within this pressure chamber 78 positions the piston member 82 and its stem 90 for normal spring loaded seating of the slotted valve head 96 disposed along the reject water flow path 92, all in the manner described previously with respect to FIGS. 1–9. During this mode of operation, reject water is permitted to flow through the valve head slot 99 at a limited flow rate for further passage through the drain path 108 and past the drain valve 140 to drain.

During purified water dispensing, the pressure in the pressure chamber decreases causing the piston member 82 to draw the enlarged upper stem portion 90′ into engagement with the valve head for positive valve head movement to the open position (FIG. 11). However, in this embodiment, a region of the stem 90 is hollow to include an upper vent port 142 disposed within a small control chamber 144 between the seal unit 110 and a support piston 146 for the drain valve 140. The hollow stem also includes a second or lower vent port 148 positioned normally above the valve head 96 at the upstream side thereof (FIG. 10). Downward motion of the valve stem 90 to open the valve head transitions the lower port 148 to a position below the valve head 96 (FIG. 11) thereby exhausting the pressure within the control chamber 144. When this occurs, a spring 150 reacting between a portion of the housing and the drain valve support piston 146 functions to displace the drain valve 140 to a positively closed position. The drain valve 140 thus insures that the substantial flow of reject water through the open path 92 is guided into the storage vessel to provide the fluid driving medium for dispensing the purified water.

When the purified water dispensing is halted, the pressure chamber 78 is repressurized in the same manner described previously. As a result, the stem 90 returns in the upward direction to permit reseating of the slotted valve head 96. Further upward travel of the stem 90 retransitions the lower port 148 to a position at the upstream side of the valve head 96 and therefore repressurizes the control chamber 144 associated with the upper vent port 142. Such repressurization of the chamber 142 overcomes the drain valve spring 150 to positively re-open the drain valve 140, thereby relieving vessel pressure.

Figure 13:
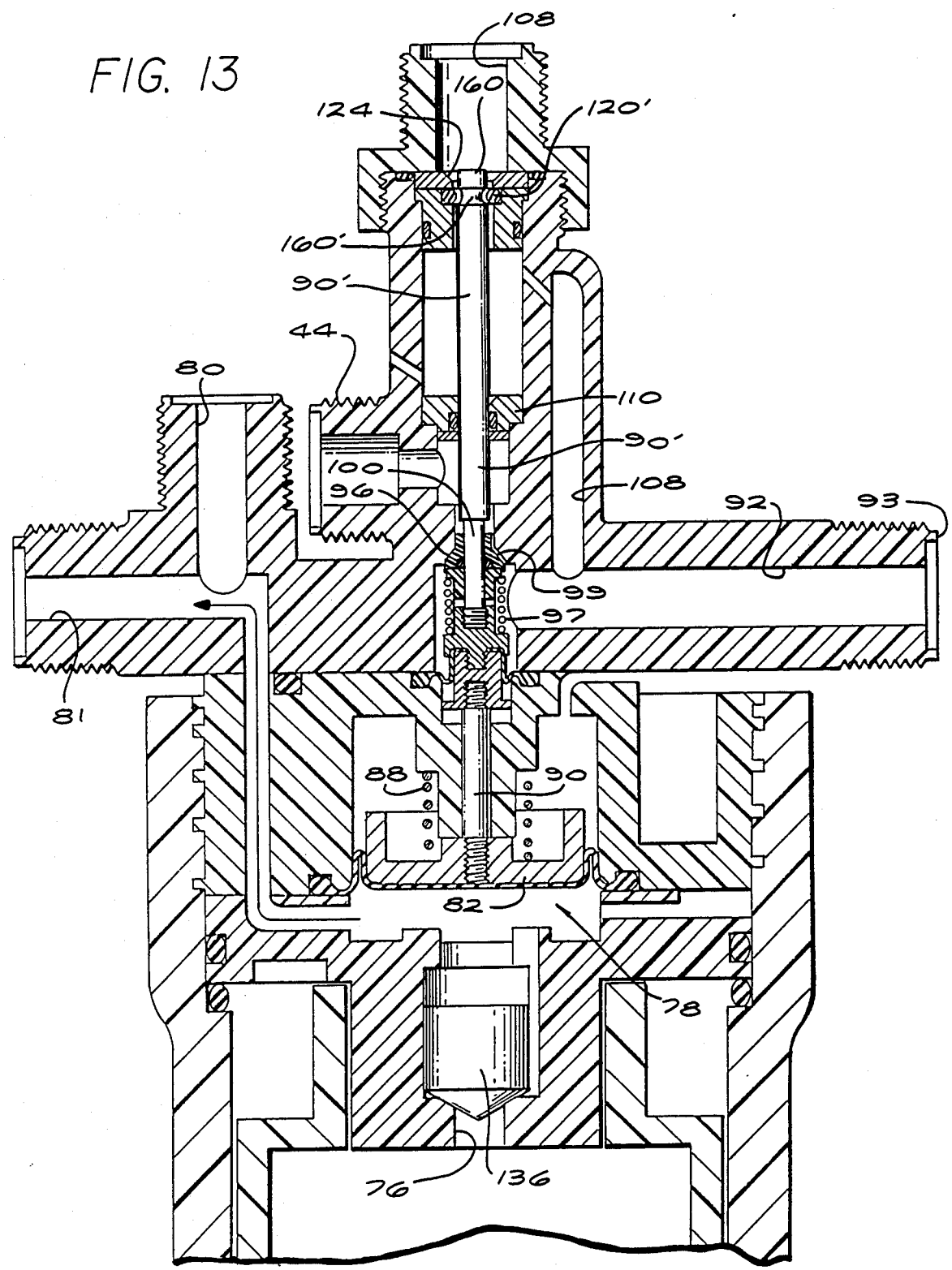
FIG. 13 is still another enlarged fragmented vertical sectional view similar to FIG. 4 but depicting a somewhat simplified alternative embodiment of the invention.

A further alternative preferred form of the invention is shown in FIGS. 13–15 wherein a simplified drain valve 160 is formed integrally on the upper stem portion 90′ of the elongated valve stem 90. In this version of the invention, the geometry of the drain valve 160 is designed for rapid closure when the valve head 96 is opened during purified water dispensing. Moreover, the drain valve 160 is formed to insure substantially full closure of the valve head 96 when purified water dispensing is halted, prior to reopening of the drain valve.

More specifically, similar to the embodiments previously described, FIGS. 13–15 depict the reject water flow regulating valve head 96 mounted on the valve stem 90 for sliding movement under the influence of a biasing spring 97 into normal, substantially closed seated relation upon the valve seat 94. In this normally closed position, when purified water dispensing is halted and the purified water chamber in the storage vessel 14 (FIG. 1) is being refilled, the valve stem 90 extends above the valve head 96 and merges with a diametrically enlarged upper stem portion 90′.

In the embodiment of FIGS. 13–15, this upper stem portion 90′ extends through a seal unit 110 into an upper region of the control valve assembly to terminate in the integrally formed drain valve 160 positioned in operative relation with a valve seat 124 unit including an O-ring seal 120′ or the like.

In operation, when purified water dispensing is desired, one or more of the purified water faucet valves is opened to result in a pressure drop within the lower pressure chamber 78 of the control valve assembly. When this occurs, the piston member 82 descends into the pressure chamber 78 to draw the stem 90 in a downward direction with a sliding action through the still-closed valve head 96. Sufficient downward displacement of the stem 90 moves the shoulder 100 thereon into bearing engagement with the valve head 96 to displace the valve head from the closed position (FIG. 13) to an open position (FIG. 14). At the same time, such downward movement of the valve stem 90 displaces a groove 160′ in the drain valve 160 from an open position generally aligned with the valve seat O-ring 120′ (FIG. 13) to a position spaced below the O-ring (FIG. 14) whereby the drain valve is moved to a closed position wherein the O-ring 120′ is sealingly engaged with a cylindrical upper head of the drain valve. Accordingly, the above-described movement of the valve stem 90 results in closure of the drain valve 160 followed shortly by opening of the valve head 96. When the valve head 96 is fully opened, as viewed in FIG. 14, the drain valve head engages the O-ring 120′ near a trailing edge of the drain valve 160.

Opening of the valve head 96 permits a substantial reject water flow into the reject water chamber of the storage vessel 14 (FIG. 1) to correspondingly displace purified water from the storage vessel through the open faucet valve or valves. The drain valve 160 remains closed throughout this dispensing cycle to insure positive and reliable purified water dispensing yet the fluid pressure within the storage vessel 14 remains substantially below tap water line pressure due to the open nature of the faucet valve.

When purified water dispensing is halted upon faucet valve closure, the fluid pressure within the storage vessel starts to increase due to the continued reject water flow past the open valve head 96 and the closed nature of the drain valve 160. This pressure rise is reflected in the pressure chamber 78 causing the piston member 82 to move upwardly. The piston member 82 thus displaces the valve head 96 back to the closed position as viewed in FIG. 15 to restrict reject water flow to the cross sectional area of the valve head slot 99, as previously described. The axial length of the head portion of the drain valve 160 is sufficient to maintain closure of the drain valve path 108 (FIG. 15) until the valve head 96 is fully seated on the valve seat 94. Further pressure rise Within the vessel and the pressure chamber 78 displaces the piston member 82 and stem 90 further in the upward direction ultimately to re-align the drain valve groove 160' with the O-ring 120' thereby reopening the drain valve and relieving the fluid pressure in the storage vessel. Importantly, this drain valve reopening occurs at a storage vessel pressure threshold substantially below tap water line pressure, due to the design characteristics of the spring-loaded piston member, to prevent exposure of the storage vessel to high fluid pressures. Moreover, a check valve 136 may be again provided at the inlet port 76 of the pressure chamber 78 to prevent chamber pressure loss until subsequent purified water dispensing is initiated. However, the check valve 136 is not required in this embodiment since the piston member 82 responding to pressure within the chamber 78 will open the drain valve 160 by a small increment sufficient to achieve partial pressure relief within the reject chamber, in the same manner as described with respect to FIGS. 1–6.

In all of the above-described embodiments of the invention, the valve head 96 of the reject water flow control valve and the reject water drain valve are arranged for simple and reliable operation. All of the valve components are aligned generally coaxially for actuation in a linear manner upon movement of the pressure responsive piston member. Importantly, the valve head 96 is fully reseated in each embodiment prior to drain valve reopening.

Accordingly, the improved purified water supply system of the present invention provides means for regulating the pressure of a purified water storage vessel to maximum pressure level substantially below tap water line pressure. In this manner, the storage vessel is not subjected to high pressure levels and can thus be constructed from lightweight materials.

A variety of further modifications and improvements to the present invention will be apparent to those of ordinary skill in the art. Accordingly, no limitation on the invention is intended by way of the description herein and the accompanying drawings, except by way of the appended claims.

What is claimed is:

1. A purified water supply system, comprising:
   a reverse osmosis unit having a tap water inlet, a purified water outlet, and a reject water outlet;
   means for coupling a tap water supply means to said inlet of said reverse osmosis unit, said reverse osmosis unit including means for producing from said tap water supply means a supply of relatively purified water at said purified water outlet, and a supply of reject water at said reject water outlet;
   a storage vessel having an internal movable barrier separating the interior of said vessel into a purified water chamber and a reject water chamber;
   flow path means for coupling said purified water supply from said purified water outlet to said purified water chamber;
   at least one faucet valve;
   flow path means defining a discharge path for said purified water supply, said discharge path being coupled between said purified water chamber and said at least one faucet valve, said at least one faucet valve being movable between a closed position closing said discharge path to prevent dispensing of said purified water supply and an open position for opening said discharge path for dispensing of the purified water supply;
   means defining a drain;
   flow path means defining a reject water flow path communicating between said reject water outlet and said reject water chamber, and for defining a reject water drain path communicating between said reject water chamber and said drain; and
   control means responsive to the operational position of said at least one faucet valve for coupling said reject water supply via said reject water drain path to said drain when said at least one faucet valve is in said closed position and for coupling said reject water supply to said reject water chamber via said reject water flow path when said at least one faucet valve is in said open position, said control means including means for regulating the pressure level within said vessel to a pressure level substantially below tap water line pressure;
   said control means including a reject water flow control valve positioned along said reject water flow path and movable between a seated position permitting a limited flow of reject water along said reject water flow path and an unseated position permitting a substantial flow of reject water along said reject water flow path, and a reject water drain valve mounted along said reject water drain path and movable between an open position permitting flow of reject water along said reject water drain path and a closed position preventing flow of reject water along said reject water drain path;
   said control means further including means responsive to the position of said at least one faucet valve for moving said flow control valve to said seated position and said drain valve to said open position when said faucet valve is in the closed position, and for moving said flow control valve to said unseated position and said drain valve to said closed position when said at least one faucet valve is in said open position, said means responsive to the position of said at least one faucet valve comprising a single actuator member for engaging and moving both of said flow control and drain valves.

2. The purified water supply system of claim 1 wherein said means responsive to the position of said at least one faucet valve comprises a piston member communicating with said discharge path, said piston member movably responding to pressure changes along said discharge path upon movement of at least one faucet valve between said open and closed positions.

3. The purified water supply system of claim 1 wherein said means responsive to the position of said at least one faucet valve comprises means for moving said flow control valve to said seated position and then moving said drain valve to said open position upon movement of said at least one faucet valve from said open position to said closed position.

4. The purified water supply system of claim 1 wherein said flow control valve and said drain valve are mounted on a common valve housing for generally coaxial linear movement, said means responsive to the position of said at least one faucet valve including means movable generally coaxially with said flow control and drain valves for displacing said flow control and drain valves between their respective positions.

5. The purified water supply system of claim 4 wherein said means responsive to the position of said at least one faucet valve comprises a piston member communicating with said discharge path, a stem carried by said piston member for sliding movement relative to said flow control valve, shoulder means formed on said stem, and means for urging said flow control valve normally to said seated position, said piston member displacing said stem upon movement of said at least one faucet valve to said open position to displace said stem shoulder means against said flow control valve to move said flow control valve to said unseated position, said stem further displacing to move said drain valve to said closed position.

6. The purified water supply system of claim 5 wherein said piston member includes means responsive to movement of said at least one faucet valve to said closed position to displace said stem to permit said urging means to return said flow control valve to said seated position and further to displace said stem to return said drain valve to said open position, said flow control valve returning to said seated position before said drain valve is returned to said open position.

7. The purified water supply system of claim 1 wherein said at least one faucet valve comprises a plurality of said faucet valves.

8. The purified water supply system of claim 1 wherein said means responsive to the position of said at least one faucet valve includes means for moving said drain valve to an incrementally open position when the pressure level in said storage vessel reaches a predetermined pressure level substantially lower than tap water line pressure.

9. The purified water supply system of claim 1 wherein said single actuator member comprises a pressure responsive piston member mounted along said discharge path and coupled to said flow control and drain valves, said piston member being responsive to pressure changes along said discharge path to movably position said flow control and drain valves, and further including a check valve mounted along said discharge path for isolating said piston member from said storage vessel when said drain valve is moved to said fully open position.

10. The purified water supply system of claim 1 further including check valve means mounted along said discharge path for isolating said discharge path from the fluid pressure within said storage vessel when said drain valve is in the fully open position.

11. In a purified water supply system including a reverse osmosis unit having a purified water outlet and a reject water outlet and including means for converting a tap water supply into a relatively purified water supply at said purified water outlet and a reject water supply at said reject water outlet, a storage vessel including internal purified water and reject water chambers separated by a movable barrier, means for coupling the purified water supply from said purified water outlet to the purified water chamber, a faucet valve movable between open and closed positions, a discharge path coupled between said purified water chamber and said faucet valve, a drain, means for defining a reject water flow path coupling the reject water supply from said reject water outlet of the reverse osmosis unit to the reject water chamber, and means defining a reject water drain path coupling the reject water chamber to the drain, an improved control valve assembly, comprising:

a reject water flow control valve mounted along said reject water flow path and movable between a seated position permitting a restricted flow of reject water to said reject water chamber, and an unseated position for permitting a substantial reject water flow to said reject water chamber;

a reject water drain valve mounted along said reject water drain path and movable between an open position permitting reject water flow to the drain and a closed position preventing reject water flow to the drain; and actuator means mounted along said discharge path and responsive to flow of purified water therethrough in accordance with the open and closed state of said faucet valve to movably position said flow control and drain valves respectively in said seated and open positions when said faucet valve is closed, and to position said flow control and drain valves respectively in said unseated and closed positions when said faucet valve is open, said actuator means comprising a piston member mounted along said discharge path and having a piston stem movable therewith and coupled to said flow control and drain valves.

12. The control valve assembly of claim 11, wherein said stem is slidably received through said flow control valve and includes a shoulder on said stem for contacting said flow control valve to displace said flow control valve in said unseated position upon movement of said faucet valve to said open position.

13. The control valve assembly of claim 12 wherein said drain valve is carried integrally with said stem.

14. The control valve assembly of claim 11 wherein said actuator means includes means for moving said drain valve to said closed position and then for moving said flow control valve to said unseated position upon movement of said faucet valve to said open position.

15. The control valve assembly of claim 14 wherein said actuator means further includes means for moving said flow control valve to said seated position and then moving said drain valve to said open position upon movement of said faucet valve from said open position to said closed position.

16. The control valve assembly of claim 11 wherein said flow control valve and said drain valve are mounted within a common valve housing for generally coaxial linear movement, said actuator means being mounted within said common housing and movable generally coaxially with said flow control and drain valves.

17. The control valve assembly of claim 11 wherein said actuator means includes means for moving said drain valve to an incrementally open position when the pressure level in said storage vessel reaches a predetermined pressure level substantially lower than tap water line pressure.

18. The control valve assembly of claim 11 wherein said actuator means includes means for moving said drain valve to a fully open position subsequent to movement of said flow control valve to said seated position upon movement of said faucet valve from said open position to said closed position, said drain valve in said fully open position substantially relieving the pressure within said storage vessel.

19. The control valve assembly of claim 18 further including a check valve mounted along said discharge path for isolating said piston member from said storage vessel when said drain valve is moved to said fully open position.

20. A purified water supply system, comprising:
a reverse osmosis unit having an inlet, a purified water outlet, and a reject water outlet;
means for coupling a tap water supply means to said inlet of said reverse osmosis unit, said reverse osmosis unit including means for producing from said tap water supply means a supply of relatively purified water at said purified water outlet, and a supply of reject water at said reject water outlet;
a storage vessel having an internal movable barrier separating the interior of said vessel into a purified water chamber and a reject water chamber;
flow means for coupling said purified water supply from said purified water outlet to said purified water chamber;
at least one faucet valve;
flow means defining a discharge path for said purified water supply, said discharge path being coupled between said purified water chamber and said at least one faucet valve, said faucet valve being movable between a closed position closing said discharge path to prevent dispensing of said purified water supply and an open position for opening said discharge path for dispensing of the purified water supply;
means defining a drain;
means defining a reject water flow path coupling reject water from said reject water outlet of the reverse osmosis unit to the reject water chamber;
means defining a reject water drain path for coupling the reject water chamber to the drain;
a reject water flow control valve mounted along said reject water flow path and movable between a seated position permitting a restricted flow of reject water to said reject water chamber, and an unseated position for permitting a substantial reject water flow to said reject water chamber;
a reject water drain valve mounted along said reject water drain path and movable between an open position permitting reject water flow to the drain and a closed position preventing reject water flow to the drain;
means forming a pressure chamber along the discharge path between said purified water chamber and said faucet valve;
a piston member exposed to and defining a movable wall at one side of said pressure chamber, said piston member being biased for displacement into said pressure chamber upon reduced pressure therein when said faucet valve is in the open position, and for displacement from said pressure chamber upon increased pressure therein when said faucet valve is in the closed position;
a piston stem carried by said piston member for movement therewith, said stem including means for displacing said flow control valve from said seated position to said unseated position upon movement of said piston member when said faucet valve is moved to the open position;
first means for positioning said drain valve in the closed position upon movement of said piston member when said faucet valve is moved to the open position; and
second means for positioning said flow control valve in said seated position upon movement of said piston member when said faucet valve is moved to the closed position;
said stem including means for displacing said drain valve to the open position upon movement of said piston member in response to movement of said faucet valve to the closed position.

21. The purified water supply system of claim 20 wherein said stem is slidably received through said flow control valve and has a shoulder thereon for engaging and moving said flow control valve to said unseated position.

22. The purified water supply system of claim 20 wherein said stem and said first and second means include means cooperating to close said drain valve before unseating of said flow control valve when said faucet control valve is opened, and further cooperating to seat said flow control valve before opening said drain valve when said faucet valve is closed.

23. The purified water supply system of claim 22 wherein said drain valve is integrally carried by said stem.

24. The purified water supply system of claim 20 wherein said stem includes means to incrementally open said drain valve when said faucet valve is closed to bleed the reject water at a limited flow rate.

25. The purified water supply system of claim 20 wherein said stem includes means to open said drain valve when said faucet valve is closed for substantially unrestricted reject water flow past said drain valve to the drain.

26. The purified water supply system of claim 25 wherein said stem includes means to contact said drain valve to move said drain valve to the fully open position.

27. The purified water supply system of claim 25 including hydraulic means operably controlled by said stem for moving said drain valve to the fully open position.

* * * * *